United States Patent [19]
Ogawa et al.

[11] Patent Number: 5,282,363
[45] Date of Patent: Feb. 1, 1994

[54] HYDRAULIC CIRCUIT FOR RUNNING A CRAWLER VEHICLE

[75] Inventors: Kazunori Ogawa; Takuma Endo; Hisashi Nakashima, all of Gifu; Yoji Asano, Aichi, all of Japan

[73] Assignee: Teijin Seiki Co., Ltd., Osaka, Japan

[21] Appl. No.: 815,023

[22] Filed: Dec. 31, 1991

[30] Foreign Application Priority Data

Dec. 31, 1990 [JP] Japan ................... 3-010002

[51] Int. Cl.⁵ .................. F16D 31/02; B62D 11/00
[52] U.S. Cl. ........................ 60/420; 60/484; 91/511; 180/6.58; 180/6.3
[58] Field of Search .............. 60/420, 426, 484, 486, 60/489, 493; 91/459, 511; 180/6.2, 6.3, 6.58, 6.6, 6.7

[56] References Cited

U.S. PATENT DOCUMENTS

| | | | |
|---|---|---|---|
| 3,442,344 | 5/1969 | Ocule | 180/6.3 |
| 3,489,235 | 1/1970 | Watson | 180/6.58 |
| 3,855,792 | 12/1974 | Bojas et al. | 60/484 X |
| 4,394,886 | 7/1983 | Rathje et al. | 180/6.58 X |
| 4,415,050 | 11/1983 | Nishida et al. | 180/6.58 X |
| 4,467,604 | 8/1984 | Forster | 60/484 |
| 4,756,156 | 7/1988 | Appel | 60/426 |
| 4,938,023 | 7/1990 | Yoshino | 60/420 X |

FOREIGN PATENT DOCUMENTS

| | | | |
|---|---|---|---|
| 0055271 | 3/1987 | Japan | 180/6.3 |
| 63-266292 | 11/1988 | Japan | . |

Primary Examiner—Edward K. Look
Assistant Examiner—Hoang Nguyen
Attorney, Agent, or Firm—Rothwell, Figg, Ernst & Kurz

[57] ABSTRACT

A hydraulic circuit for running a crawler vehicle which comprises a running frame portion provided with motors for running the crawler vehicle and an upper swivel portion turnably disposed on the running frame portion via a swivel joint. Electro-magnetic proportional flow directional control valve (a directional control valves) (15) for controlling the running motors are disposed between the swivel joint (41) and the running motors (19). The number of the high pressure passages in the swivel joint (41) can be reduced, because of increase of pressure resistance, the size of the swivel joint can be small, and accordingly, the hydraulic circuit for running a crawler vehicle can be inexpensive, and possibility for leakage of pressure oil becomes low.

17 Claims, 8 Drawing Sheets

HYDRAULIC CIRCUIT FOR RUNNING A CRAWLER VEHICLE

TECHNICAL FIELD OF THE INVENTION

The present invention relates to a hydraulic circuit for running a crawler vehicle which comprises a running frame portion provided with motors for running the crawler vehicle and an upper swivel portion turnably disposed on the running frame portion via a swivel joint.

As illustrated in FIG. 10, in a conventional crawler vehicle 1, such as a power shovel, the flow direction of the pressure oil in the hydraulic passage is changed by a control valve (not shown) which is disposed on the upper swivel portion located above the swivel joint, and the pressure oil from the control valve is passed through the swivel joint located at the center of the swivel portion and is introduced into control valves, such as brake valves, which are accompanying the right and left running motors 3 so as to control the movement of the running motors 3.

Such a conventional hydraulic circuit for running a crawler vehicle, such as a power shovel, has the following disadvantages.

(1) Since the control portion for controlling the drive of the running motors are divided into two, i.e., the directional control valve and the control valve, such as the brake valves, the control system of the running motors is complicated.

(2) Since the control system is divided into two, pressure piping for connecting the divided two portions is indispensable, these are at least five pipes for the right and left running motors, i.e., four high pressure pipes for driving the running motors and one drain pipe. Under the recent movement wherein the pressure for crawler vehicles is increasing, if the high pressure pipes and the swivel joint are intended to be resistant to such a high pressure, their cost will be enhanced.

OBJECTS OF THE INVENTION

Taking into consideration the disadvantages inherent to the conventional hydraulic circuit, the present invention is to achieve the following objects.

(1) A control portion for controlling the running motors, which portion has been divided into two as described above, is disposed on the running frame portion, on which the running motors are disposed, so as to facilitate easy control of the running motors.

(2) The number of pressure pipes between the divided control portion, i.e., between the directional control valve and the brake valve portion, including that of the high pressure pipes, is minimized and the pressure resistance reliability is enhanced.

SUMMARY OF THE INVENTION

The present invention achieves the above-described objects by a hydraulic circuit for running a crawler vehicle which comprises a running frame portion provided with motors for running the crawler vehicle and an upper swivel portion turnably disposed on the running frame portion via a swivel joint, wherein directional control valves for controlling the running motors are disposed between the swivel joint and the running motors.

It is preferred that the directional control valves of the present invention are electro-magnetic flow directional control valves provided with electro-magnetic solenoid valves. Use of such an electro-magnetic flow directional control valve reduces the number of the hydraulic pipes passing through the swivel joint, and accordingly, the swivel joint can be simple in its construction. Further, the electro-magnetic solenoids can be actuated by electric signals emitted from the controller so that the running motors can be electrically operated when electro-magnetic flow directional control valves are used for directional control valves. The resulting hydraulic circuit complies with recent computerization of crawler vehicles.

When the directional control valves are electro-magnetic flow directional control valves, each electro-magnetic flow directional control valve may be formed integrally with the corresponding running motor and the accompanying brake valve.

Alternatively, the electro-magnetic flow directional control valves may be disposed just below the swivel joint overlapping with the swivel joint. In this case, the electro-magnetic flow directional control valves for the right and left running motors are overlapped with each other. When the electro-magnetic flow directional control valves are overlapped with the swivel joint as described above, hydraulic piping and electric wiring is simplified.

Further, in this case, since the electro-magnetic flow directional control valves are located at relatively high positions, troubles in the electrical system of a crawler vehicle, which is often used under damp conditions, are prevented from occurring.

A pair of high pressure pipes and a pair of low pressure pipes may be connected to each other, respectively, at a position below the swivel joint.

Further, a pressure reducing pressure control valve may be disposed between the directional control valve and a supply pipe for the running motor whereby reduced and controlled pressure is introduced into the directional control valve as a control pressure therefor. Thus, the control portions of the directional control valves are enhanced in their durability and reduced in their sizes.

BRIEF DESCRIPTION OF THE DRAWINGS

Some embodiments of the present invention will now be explained with reference to the accompanying drawings, wherein.

PREFERRED EMBODIMENTS

Figure 1:
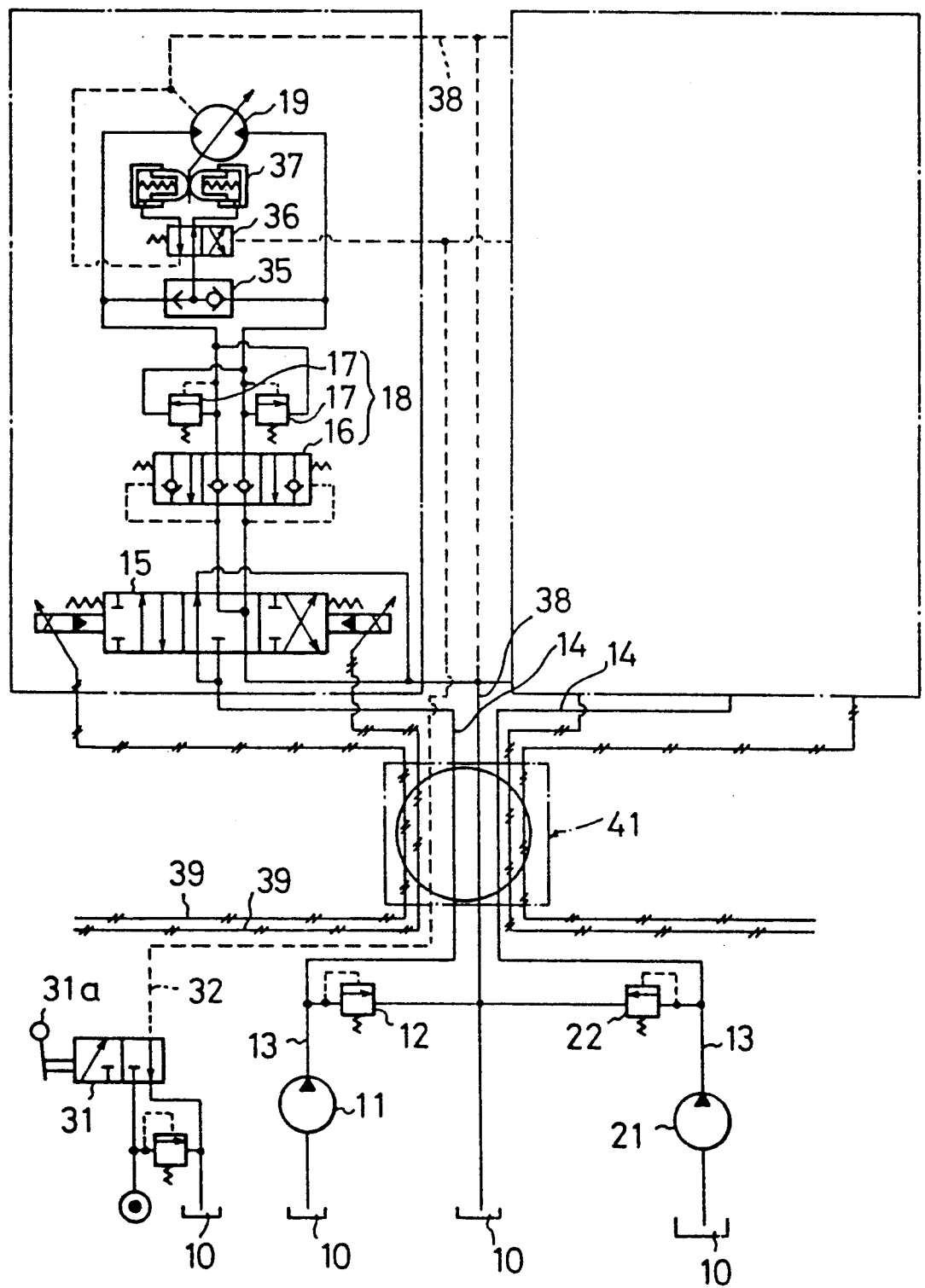
FIG. 1 is a circuit diagram of an embodiment of the present invention which is carried out in a hydraulic circuit for running a power shovel.

In FIG. 1, the present invention is carried out in a power shovel, and the crawler vehicle, i.e., the power shovel, of the present invention comprises a running frame portion provided with motors for running the crawler vehicle and an upper swivel portion turnably disposed on the running frame portion via a swivel joint.

Although right and left wheels of a power shovel are usually driven by individual running motors, FIG. 1 illustrates in detail only a hydraulic circuit for the left running motor, and the detailed illustration for the right running motor is omitted since it is similar to that for the left running motor.

In FIG. 1, pressure oil sucked from an oil tank 10 by hydraulic pumps 11 and 21 passes through a high pressure pipe 13 and a swivel joint 41, and further through a high pressure pipe 14, and then, it is supplied to an inlet port of an electro-magnetic proportional flow directional control valve 15, which is an embodiment of the directional control valve of the present invention. The high pressure pipes 13 disposed between the hydraulic pumps 11 and 21 and the swivel joint 41 have relief valves 12 and 22, typically found in a hydraulic circuit for a power shovel.

The outlet port of the electro-magnetic proportional flow directional control valve 15 is communicated with a counterbalance valve 16, the piping of which has relief valves 17. The counterbalance valve 16 and the relief valves 17 as a whole constitute a brake valve 18.

The brake valve 18 is communicated with a running motor 19 for driving the power shovel through a high pressure selecting valve 35, a pilot valve 36 and an actuator 37 for controlling volume of the running motor 19, i.e., for controlling speeds of the running motor 19 in dual modes. Further, return oil from the power shovel running motors 19 is returned to the oil tank 10 through exhaust pipes 38.

The pilot valve 36 is controlled by the control pressure which is supplied from a dual speed changing valve 31 disposed at an operator's seat and provided with a manual lever 31a through a pipe 32 for controlling volume of the motor, so that volume of the power shovel running motor 19 is controlled, in other words, the speeds of the motor 19 is controlled in dual modes, i.e., the high speed mode and the low speed mode.

The electro-magnetic proportional flow directional control valve 15 is controlled by electric signals emitted from an appropriated means, such as a joy stick disposed on the upper swivel portion and transmitted via control wire 39 so that it controls the supply of the pressure oil to the power shovel running motor 19, and accordingly, the forward movement, the backward movement and stop of the power shovel.

Figure 2:
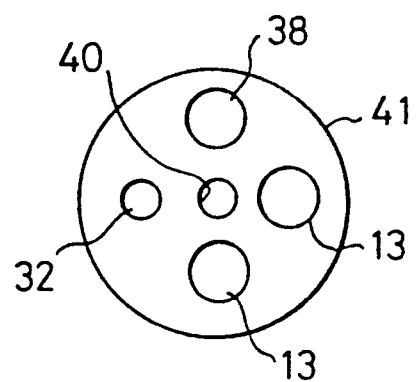
FIG. 2 is a schematic sectional view of a swivel joint used in an embodiment of the present invention.

FIG. 2 schematically illustrates the cross section of the swivel joint 41, which is disposed between the running frame portion and the upper swivel portion in such a manner that the upper swivel portion is turnable relative to the running frame portion.

As illustrated in FIG. 2, the swivel joint 41 of the present embodiment has very minimum number of holes, such as, only two high pressure passages 13 and 13, one low pressure passage (i.e., exhaust passage) 38, the control passage 32 for volume of the motor, and a hole 40 for inserting control wires 39 for the electromagnetic proportional flow directional control valve 15. According to the present invention, the number of the high pressure pipes can be decreased compared with a conventional device. The present invention thus has an advantage in that the number of holes formed in the swivel joint 41 can be small.

Figure 3:
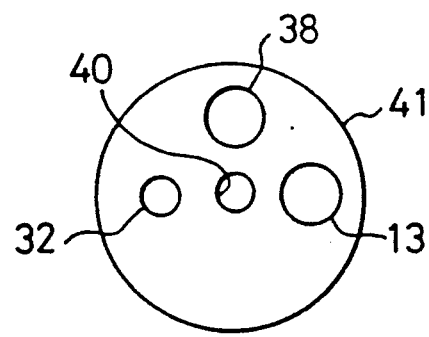
FIG. 3 is a schematic sectional view of a swivel joint used in another embodiment of the present invention.

Further, as illustrated in FIG. 3, when the high pressure pipes are gathered in one, the number of holes formed in the swivel joint 41 can be further reduced.

The electro-magnetic proportional flow directional control valve 15 is disposed below the swivel joint 41 in this embodiment, and the signal transmission of the electro-magnetic proportional flow directional control valve 15 at the swivel joint portion 41 can be assured by using brush type collector shoe which is widely used in direct current motors.

Further, although the electro-magnetic proportional flow directional control valve 15 is used in the above-described embodiment, a directional control valve of a hydraulic pilot operated type may be used in place of the electro-magnetic proportional flow directional control valve 15. In this case, hydraulic pressure can be supplied through the swivel joint 41 since the working hydraulic pressure is low, for example 35 Kg/cm² for a directional control valve of a hydraulic pilot operated type.

Figure 4:
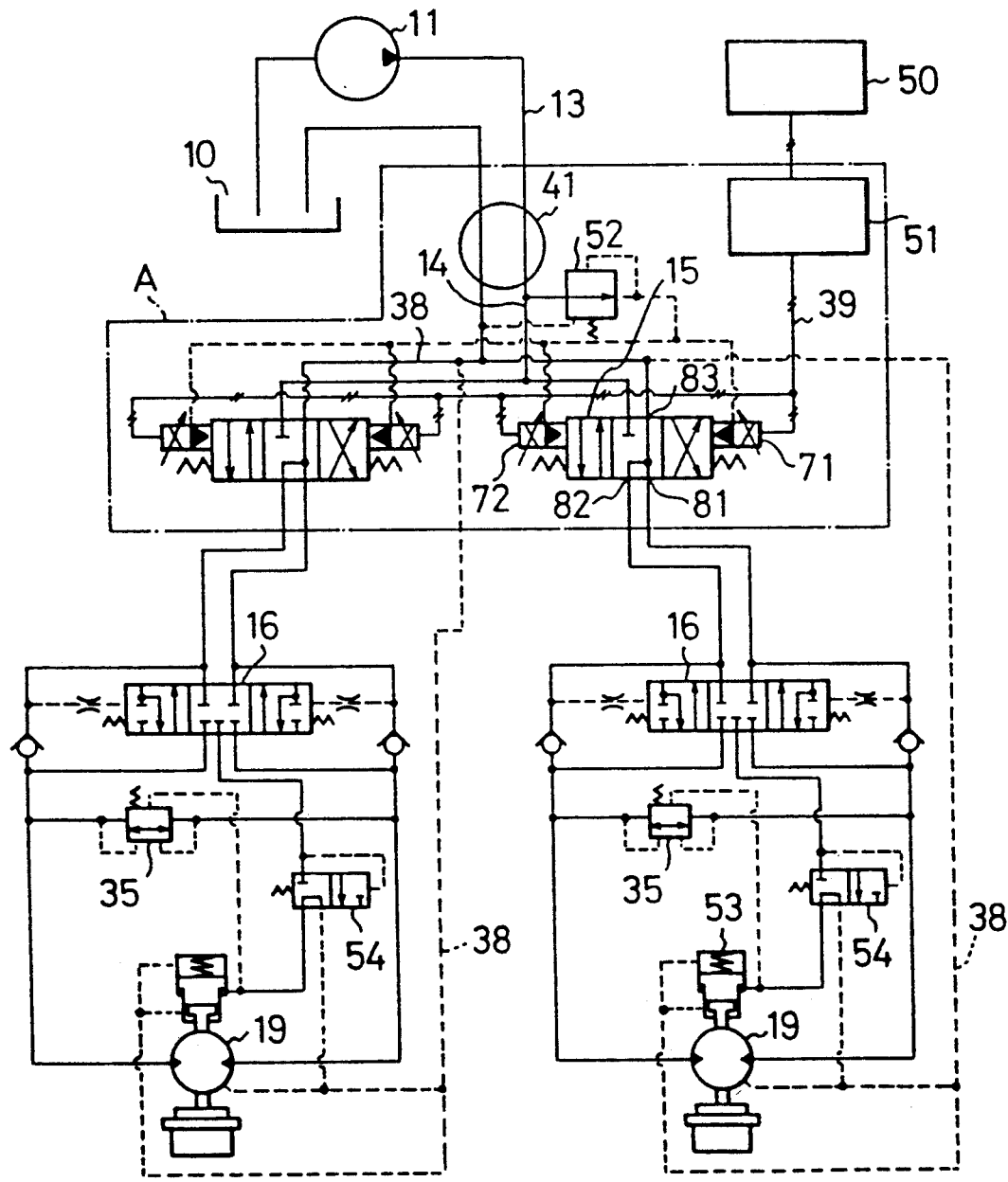
FIG. 4 is a circuit diagram of another embodiment of the present invention which is carried out in a hydraulic circuit for running a power shovel.

Another embodiment will now be described with reference to FIG. 4, which is roughly different from that of FIG. 1 in the following points; that the vertical direction of FIG. 4 is reverse to that of FIG. 1: that both the hydraulic circuits for the right and left motors are illustrated: that the running motor 19 in FIG. 4 is of a single speed mode while that in FIG. 1 can be changed between the dual modes, i.e., the high speed mode and the low speed mode; and that the working hydraulic pressure supplied to the running motor 19 is partially reduced its pressure by a pressure reducing pressure control valve to obtain the control pressure for the electro-magnetic proportional flow directional control valve 15 in FIG. 4.

More specifically, in FIG. 4, pressure oil sucked from an oil tank 10 by a hydraulic pump 11 passes through a high pressure pipe 13 and a swivel joint 41, and further through a high pressure pipe 14, and then, it is supplied to an inlet port of an electro-magnetic proportional flow directional control valve 15, which is an embodiment of the directional flow control valve of the present invention. The high pressure pipes 13 disposed between the hydraulic pumps 11 and the swivel joint 41 may have relief valves (not shown) similar to the hydraulic circuit for a power shovel illustrated in FIG. 1.

The electro-magnetic proportional flow directional control valve 15 has two electro-magnetic solenoids 71 and 72, which are controlled in accordance with, for example, pulse width modulation (PWM) control by electric signals emitted from an appropriated means, such as a joy stick 50 disposed on the upper swivel portion and transmitted via a signal wire connecting device 51 of a brush type disposed on the swivel joint 41 and control wires 39 so that they control the supply of the pressure oil to the power shovel running motor 19, and accordingly, the forward movement, the backward movement and stop of the power shovel. Although illustration in FIG. 4 is omitted, the control wire 39 passes through the swivel joint 41 similarly to the previous embodiment. In FIG. 4, the control pressure for the electro-magnetic proportional flow directional control valve 15 is supplied from the high pressure pipe 14 connected to the running motor 19 through a pressure reducing pressure control valve 52, and accordingly, the control portion of the directional control valve is enhanced in its durability and is reduced in its size.

The outlet ports, i.e., A port 81 and and B port 82, of the electro-magnetic proportional flow directional control valve 15 are communicated with a counterbalance valve 16 which in turn, communicates with a power shovel running motor 19. The oil exhausted from the power shovel running motor 19 returns to an oil tank 10 via an exhaust pipe 38. Reference numeral 53 in FIG. 4 designates a parking brake, which is actuated by a selector valve 54 when the counterbalance valve 16 is in its neutral position.

Figure 5:
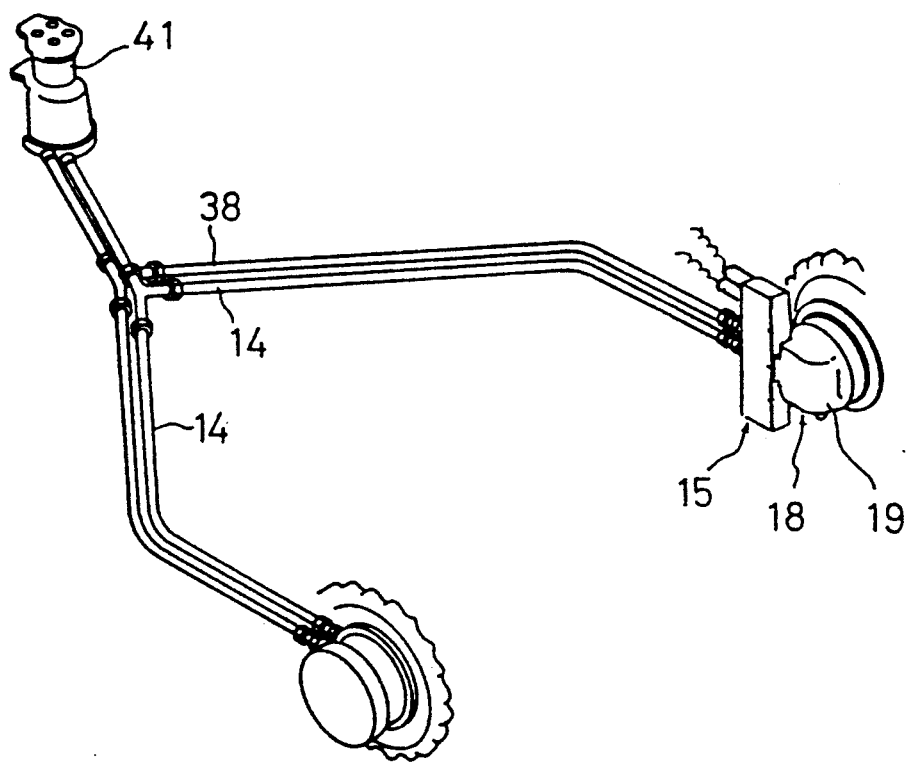
FIG. 5 is a perspective view of an embodiment of the present invention wherein electro-magnetic proportional flow directional control valves are disposed adjacent to running motors.

With regard to the arrangement of the electro-magnetic proportional flow directional control valve 15, it may be disposed adjacent to the running device, i.e., brake valve and the running motor, of the crawler vehicle as illustrated in FIG. 5. On this occasion, the piping from the swivel joint to the electro-magnetic proportional flow directional control valve 15 includes two high pressure pipes, which are branched at a position below the swivel joint 41 to the running motors 19, and two low pressure pipes 38 from the running motors 19, which are connected to each other at a position below the swivel joint 41. In the embodiment illustrated in FIG. 5, the drain passage 38 from the hydraulic motor 38 and the exhaust passage 38 in the electro-magnetic proportional flow directional control valve 15 are connected to each other within a case of the electro-magnetic proportional flow directional control valve 15, and accordingly, it is unnecessary to prepare a specific drain pipe.

In another arrangement of the electro-magnetic proportional flow directional control valves 15 of the present invention, they are disposed just below the swivel joint in such a manner that they overlap with each other. According to this arrangement, since the electro-magnetic flow directional control valves 15 are located at relatively high positions, damage to the electro-magnetic proportional flow directional control valve 15 due to water and troubles in the electrical system, such as leakage of electrical control signals, of a crawler vehicle, which is often used under damp conditions, are prevented from occurring.

Figure 6:
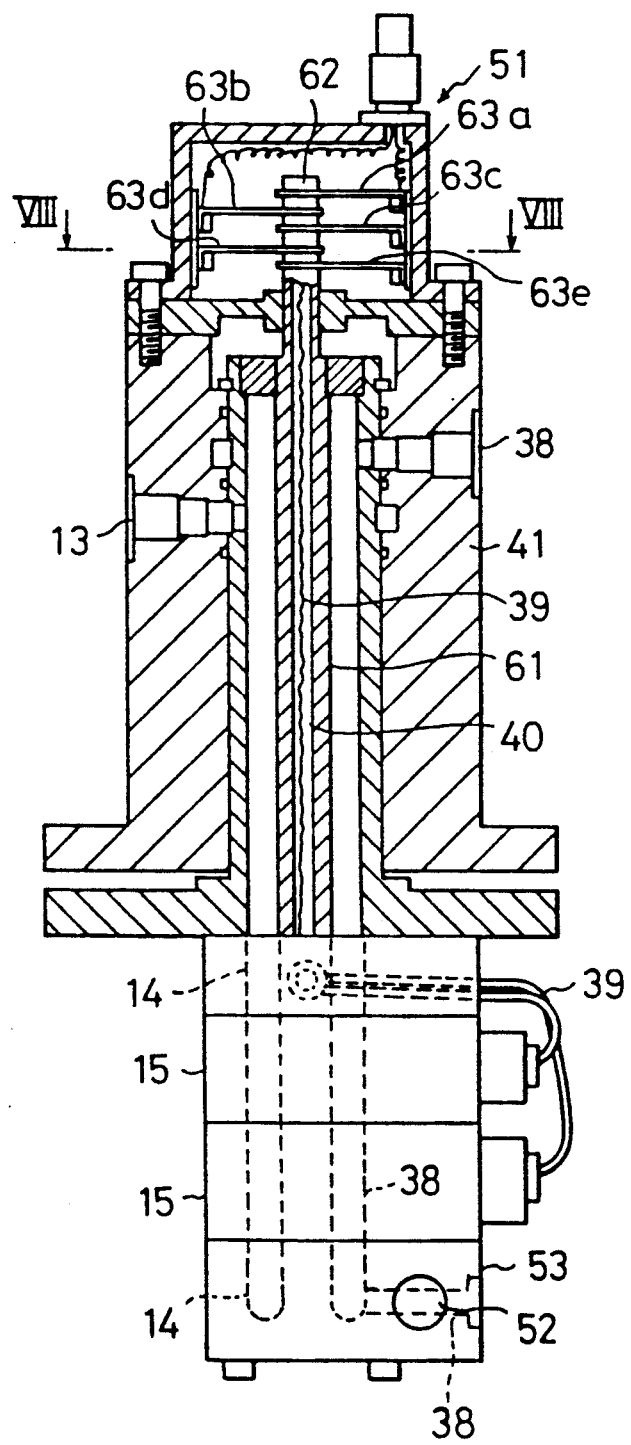
FIG. 6 is a partially cross sectioned view of an embodiment of the present invention wherein electro-magnetic proportional flow directional control valves are overlapped with each other and are disposed below a swivel joint.
Figure 7:
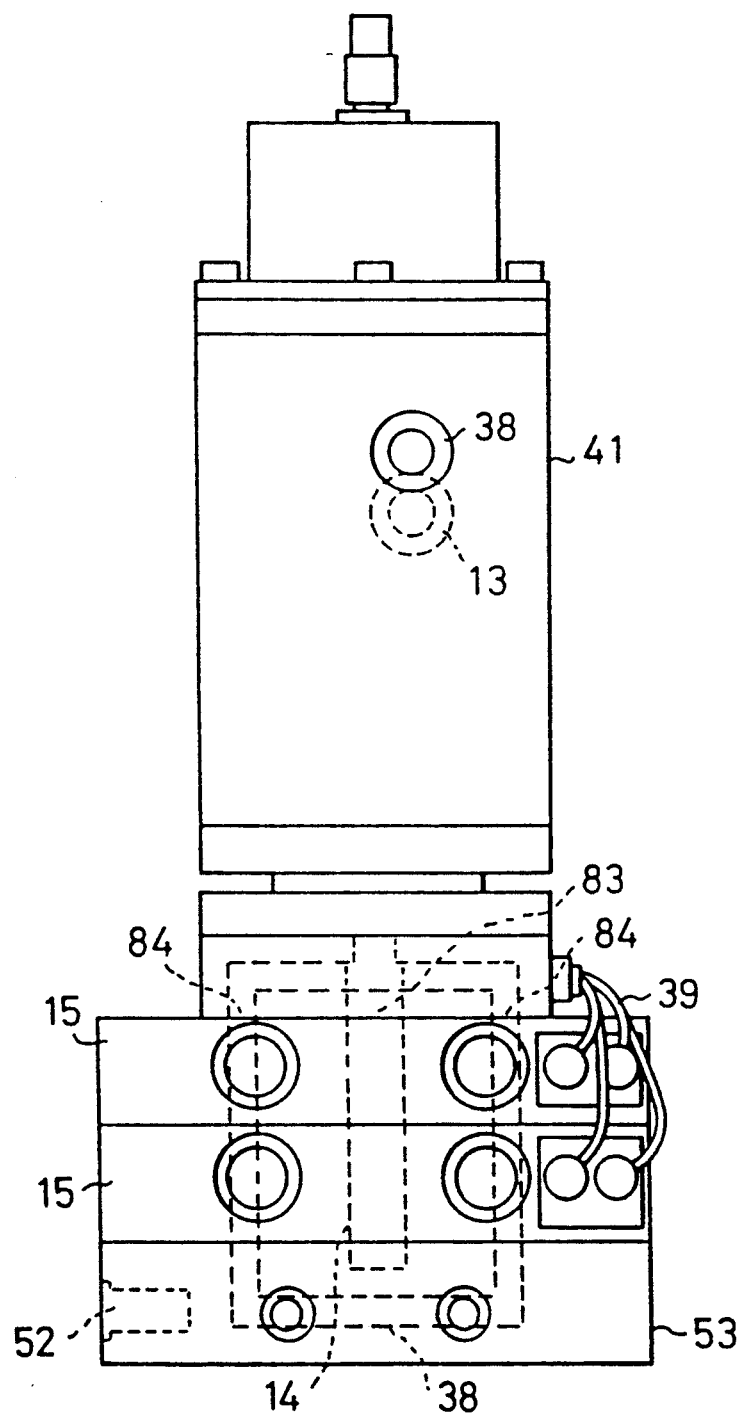
FIG. 7 is a side view of FIG. 6.
Figure 8:
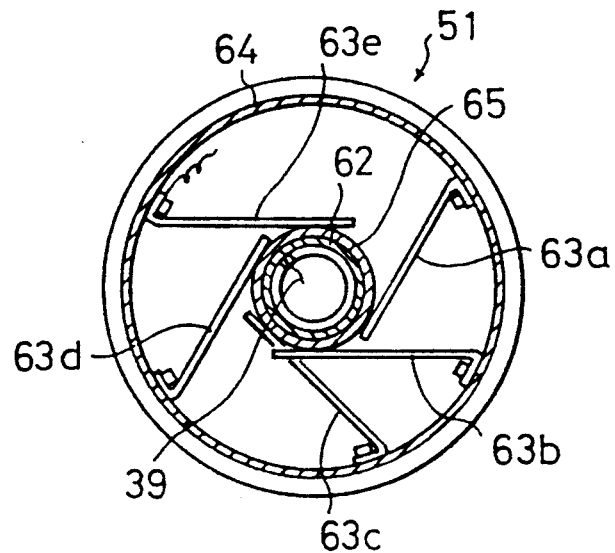
FIG. 8 is a cross sectional view of the swivel joint sectioned along a line VIII—VIII in FIG. 6.

An embodiment of this type will now be explained with reference to FIGS. 6 through 9. FIG. 6 shows a portion A encircled in FIG. 4. In FIG. 6, the swivel joint 41 has hydraulic passages formed therein. Slip rings 62, which are connected to respective control wires 39 including a ground line, are disposed at the top of the swivel shaft 61 of the swivel joint 41. Brushes 63a, 63b, 63c, 63d and 63e are attached to the inside of the cylindrical chamber contact with the slip rings 62, and signals are transmitted through the contact. Reference numerals 64 and 65 in FIG. 8 denote insulating materials. The above-described slip rings 62 and the brushes 63a, 63b, 63c, 63d and 53e as a whole constitute the signal wire connecting device 51. The swivel joint is supplied with pressure oil from the above-described high pressure pipe 13, and the pressure oil is supplied to the electro-magnetic proportional flow directional control valve 15 through the high pressure pipe 14. The return low pressure is returned through the low pressure pipe 38, and then it flows in the oil tank 10 through the swivel joint 41. Further, a pressure reducing pressure control valve 52 is disposed at the lowermost position of the electro-magnetic proportional flow directional control valves 15 which are overlap one over the other, and in a block 53, it receives the pressure oil from the passage 14, reduces a part of the working oil and introduces the reduced working oil as the control pressure of the electro-magnetic proportional flow directional control valve 15 to the C port 76 of the electro-magnetic proportional flow directional control valve 15 for actuating the right and left running motors 19 through a passage which is formed in the block 53 (not shown).

Figure 9:
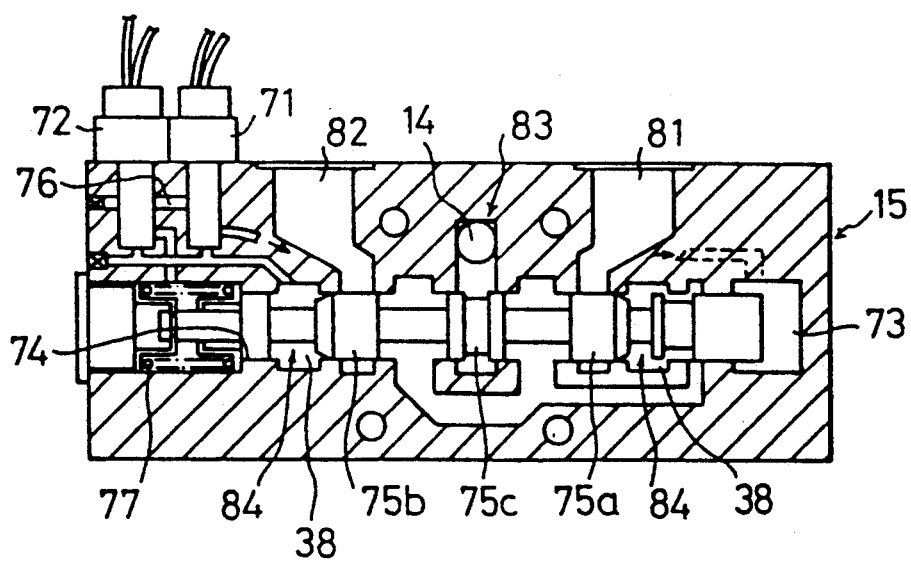
FIG. 9 is a cross sectional view of the proportional directional control valve illustrated in FIGS. 6 and 7.
Figure 10:
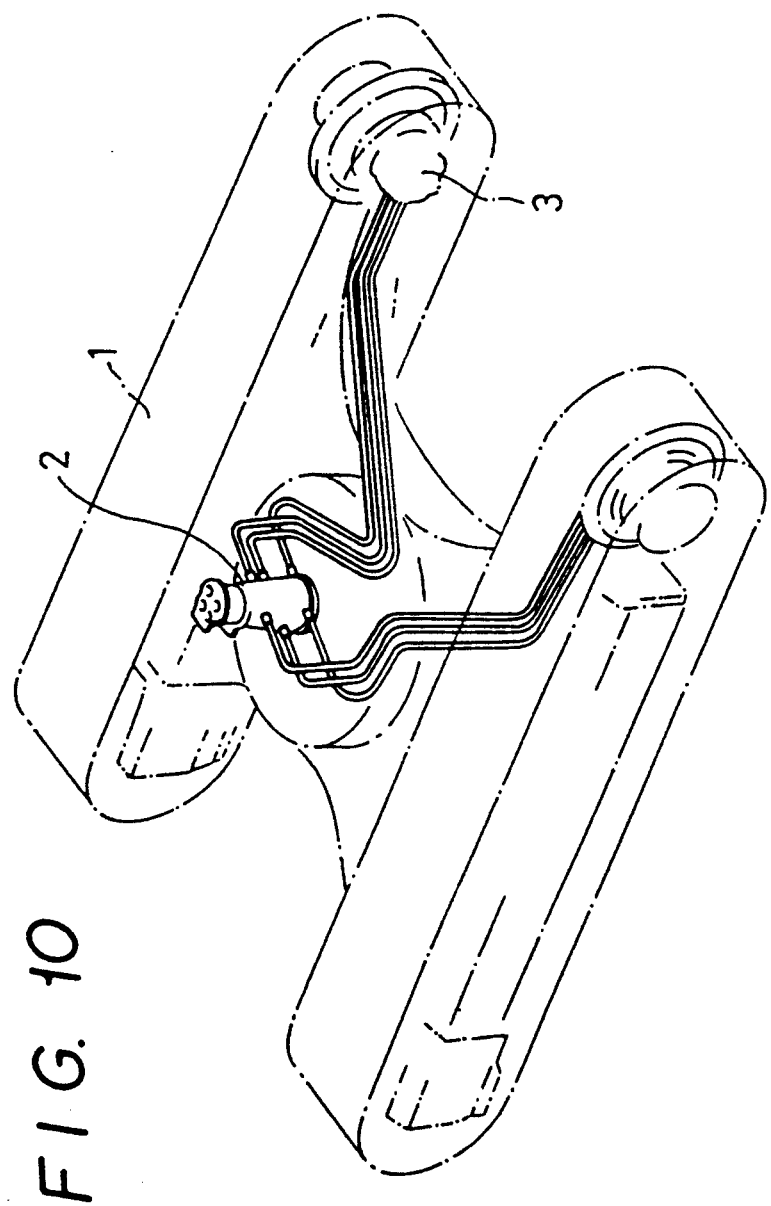
FIG. 10 is a schematic perspective view of a conventional device.

The construction of the electro-magnetic proportional flow directional control valve 15 used in this embodiment will now be described with reference to FIG. 9. The electro-magnetic proportional flow directional control valve 15 has two electro-magnetic valves 71 and 72, and it has two chambers, i.e., A chamber 73 and B chamber 74, formed at the ends thereof. A spool 75 is slidably (in the horizontal direction) and sealingly inserted within a cylindrical portion located between the A chamber 73 and B chamber 74. The spool has two lands, i.e., a land 75a facing A port 81 and a land 75b facing B port 82, and a land 75c, which faces P port 83 communicating with the high pressure pipe 14. Reference numeral 77 denotes a spool centering mechanism of a known type.

The pressure oil reduced by the pressure reducing pressure control valve 52 is supplied to the C port 76. The C port is communicating with the A chamber 73 through the electro-magnetic valve 71 and similarly communicating with the B chamber 74 through the electro-magnetic valve 72. When the electro-magnetic valve 71 is activated, the control pressure introduced from the C port 76 flows into the A chamber 73, and accordingly, the P port 83, with which the high pressure pipe 13 is communicating, communicates with the B port 82, and the T port 84 communicating with the tank 10 communicates with the A port 81. Contrary to this, when the electro-magnetic valve 72 is activated, the control pressure introduced from the C port 76 flows into the B chamber 74, and accordingly, the P port 83, with which the high pressure pipe 14 is communicating, communicates with the A port 81, and the T port 84 communicating with the tank 10 communicates with the B port 82.

When the electro-magnetic valves 71 and 72 are activated in the foregoing manner, the direction and flow of the pressure oil from the electro-magnetic proportional flow directional control valve 15 can be controlled. When the electro-magnetic valve 71 is not turned on, the A chamber 73 communicates with the low pressure passage via the electro-magnetic valve 71. Similarly when the electro-magnetic valve 72 is not turned on, the B chamber 74 communicates with the low pressure passage via the electro-magnetic valve 72.

The present invention is not limited to a power shovel and is applicable to any types of crawler vehicles, including mini shovel, as long as the crawler vehicle comprises a running frame portion provided with motors for running the crawler vehicle and an upper swivel portion turnably disposed on the running frame portion via a swivel joint.

According to the present invention, the number of the passages for high pressure oil within the swivel joint can be minimized, and because of increase of pressure resistance, the size of the swivel joint can be small, and accordingly, the hydraulic circuit for running a crawler vehicle, such as a power shovel, can be inexpensive.

Further, according to the present invention, since the number of the high pressure passages can be small, the possibility of leakage of pressure oil is less.

In addition, when an electro-magnetic proportional flow directional control valve is used as the directional control valve as illustrated in the embodiments, the running motor can be directly controlled, as well as safe and fine control being achieved.

We claim:

1. A crawler vehicle comprising:
a running frame portion, hydraulic motors for running the crawler vehicle, a hydraulic circuit for running the crawler vehicle, an upper swivel portion turnably disposed on the running frame portion, a swivel joint disposed on said swivel portion, hydraulic pumps corresponding to said hydraulic motors, high pressure fluid passages which supply said hydraulic motors with pressure fluid and which are formed in said swivel joint, and directional control valves for controlling said hydraulic running motors, wherein the control valves are disposed between said swivel joint and said running motors and communicate with said high pressure passages;
wherein said directional control valves are electro-magnetic flow directional control valves provided with electro-magnetic valves; and
wherein said electro-magnetic flow directional control valves are integrally disposed with said running motors, respectively, without having any pipe arrangement therebetween.

2. A crawler vehicle comprising:
a running frame portion, hydraulic motors for running the crawler vehicle, a hydraulic circuit for running the crawler vehicle, an upper swivel portion turnably disposed on the running frame portion, a swivel joint disposed on said swivel portion, hydraulic pumps corresponding to said hydraulic motors, high pressure fluid passages which supply said hydraulic motors with pressure fluid and which are formed in said swivel joint, and directional control valves for controlling said hydraulic running motors, wherein the control valves are disposed between said swivel joint and said running motors and communicate with said high pressure passages;
wherein said directional control valves are electro-magnetic flow directional control valves provided with electro-magnetic valves; and
wherein said electro-magnetic flow directional control valves are disposed just below said swivel joint, without having any pipe arrangement between said valves and said swivel joint.

3. A crawler vehicle comprising:
a running frame portion, two hydraulic motors for running the crawler vehicle, an upper swivel portion turnably disposed on the running frame portion, a swivel joint disposed on said swivel portion, a single hydraulic pump for the two hydraulic motors, a common high pressure fluid passage which is formed in said swivel joint and supplies said hydraulic motors with pressure fluid, wherein said high pressure fluid passage is branched downstream of said swivel joint to form two high pressure fluid passages for said hydraulic pump, and two directional control valves for controlling said hydraulic running motors, wherein the control valves are disposed between said swivel joint and said running motors and communicate with said high pressure passages;
wherein said directional control valves are electro-magnetic flow directional control valves provided with electro-magnetic valves; and
wherein said electro-magnetic flow directional control valves are integrally disposed with said running motors, respectively, without having any pipe arrangement therebetween.

4. A crawler vehicle comprising:
a running frame portion, two hydraulic motors for running the crawler vehicle, an upper swivel portion turnably disposed on the running frame portion, a swivel joint disposed on said swivel portion, a single hydraulic pump for the two hydraulic motors, a common high pressure fluid passage which is formed in said swivel joint and supplies said hydraulic motors with pressure fluid, wherein said high pressure fluid passage is branched downstream of said swivel joint to form two high pressure fluid passages for said hydraulic pump, and two directional control valves for controlling said hydraulic running motors, wherein the control valves are disposed between said swivel joint and said running motors and communicate with said high pressure passages;
wherein said directional control valves are electro-magnetic flow directional control valves provided with electro-magnetic valves; and
wherein said electro-magnetic flow directional control valves overlap.

5. A crawler vehicle according to claim 2 wherein said electro-magnetic flow directional control valves overlap each other.

6. A crawler vehicle according to claim 1 wherein a pressure reducing pressure control valve is disposed between said directional control valve and a supply pipe for said running motor whereby reduced and controlled pressure is used as a control pressure for said directional control valve.

7. A crawler vehicle according to claim 1 comprising two rotary-type hydraulic motors for running the crawler vehicle, two hydraulic pumps corresponding to said hydraulic motors, two high pressure fluid passages which supply said hydraulic motors and two directional control valves of a three position type for controlling said hydraulic running motors.

8. A crawler vehicle according to claim 1 further comprising pressure reducing valves for supplying pressure obtained by reducing the pressure in said high pressure fluid passage to said control valves as pilot pressure, wherein said pressure reducing valves communicate with said high pressure fluid passages located between said hydraulic pumps and said directional control valves.

9. A crawler vehicle according to claim 1 further comprising pressure reducing valves for supplying pressure obtained by reducing the pressure in said high pressure fluid passage to said control valves as pilot pressure, wherein said pressure reducing valves communicate with said high pressure fluid passages located between said hydraulic pumps and said electro-magnetic flow directional control valves.

10. A crawler vehicle according to claim 3 which comprises two rotary-type hydraulic motors and two directional control valves of a three position type.

11. A crawler vehicle comprising:
a running frame portion, two hydraulic motors for running the crawler vehicle, an upper swivel portion turnably disposed on the running frame portion, a swivel joint disposed on said swivel portion, a single hydraulic pump for the two hydraulic motors, a common high pressure fluid passage which is formed in said swivel joint and supplies said hydraulic motors with pressure fluid, wherein said high pressure fluid passage is branched downstream of said swivel joint to form two high pressure fluid passages for said hydraulic pump, and two directional control valves for controlling said hydraulic running motors, wherein the control valves are disposed between said swivel joint and said running motors and communicate with said high pressure passages;
wherein said directional control valves are electro-magnetic flow directional control valves provided with electro-magnetic valves; and
wherein said electro-magnetic flow directional control valves overlap and are disposed just below said swivel joint, without having any pipe arrangement therebetween.

12. A crawler vehicle according to claim 2 wherein a pressure reducing pressure control valve is disposed between said directional control valves and a supply pipe for said running motor whereby reduced and controlled pressure is used as a control pressure for said directional control valve.

13. A crawler vehicle according to claim 2 further comprising two rotary-type hydraulic motors for running the crawler vehicle, two hydraulic pumps corresponding to said hydraulic motors, two high pressure fluid passages which supply said hydraulic motors and two directional control valves of a three position type for controlling said hydraulic running motors.

14. A crawler vehicle according to claim 2 further comprising pressure reducing valves for supplying pressure obtained by reducing the pressure in said high pressure fluid passage to said control valves as pilot pressure, wherein said pressure reducing valves communicate with said high pressure fluid passages located between said hydraulic pumps and said directional control valves.

15. A crawler vehicle according to claim 2 further comprising pressure reducing valves for supplying pressure obtained by reducing the pressure in said high pressure fluid passage to said control valves as pilot pressure, wherein said pressure reducing valves communicate with said high pressure fluid passages located between said hydraulic pumps and said electro-magnetic flow directional control valves.

16. A crawler vehicle according to claim 4 which comprises two rotary-type hydraulic motors and two directional control valves of a three position type.

17. A crawler vehicle according to claim 11 which comprises two rotary-type hydraulic motors and two directional control valves of a three position type.

* * * * *